No. 636,870. Patented Nov. 14, 1899.
W. S. VANKIRK.
ANIMAL TRAP.
(Application filed May 25, 1899.)
(No Model.)

Witnesses
Clarence U. Walker
O. S. Tupard

W. S. Vankirk, Inventor
By his Attorneys,
C. A. Snow & Co.

UNITED STATES PATENT OFFICE.

WILLIAM S. VANKIRK, OF MIDDLESBOROUGH, KENTUCKY.

ANIMAL-TRAP.

SPECIFICATION forming part of Letters Patent No. 636,870, dated November 14, 1899.

Application filed May 25, 1899. Serial No. 718,164. (No model.)

*To all whom it may concern:*

Be it known that I, WILLIAM S. VANKIRK, a citizen of the United States, residing at Middlesborough, in the county of Bell and State of Kentucky, have invented a new and useful Animal-Trap, of which the following is a specification.

This invention relates to animal-traps of that class embodying a tilting or swinging platform adapted to drop the animal into a box or inclosure, and has for its object to provide improved means for locking the platform in its set or normal position and a trip for releasing the platform and adapted to be automatically actuated by the animal.

To these ends the present invention consists in the combination and arrangement of parts, as will be hereinafter more fully described, shown in the accompanying drawings, and particularly pointed out in the appended claims, it being understood that the improvement is susceptible of various changes in the form, proportion, size, and the minor details of construction without departing from the spirit or sacrificing any of the advantages of this invention.

Figure 1:
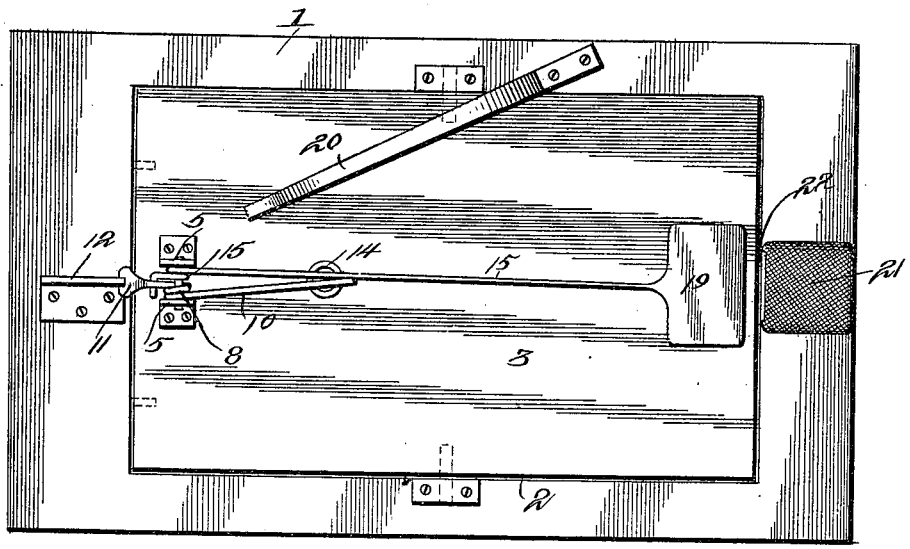
Figure 2:
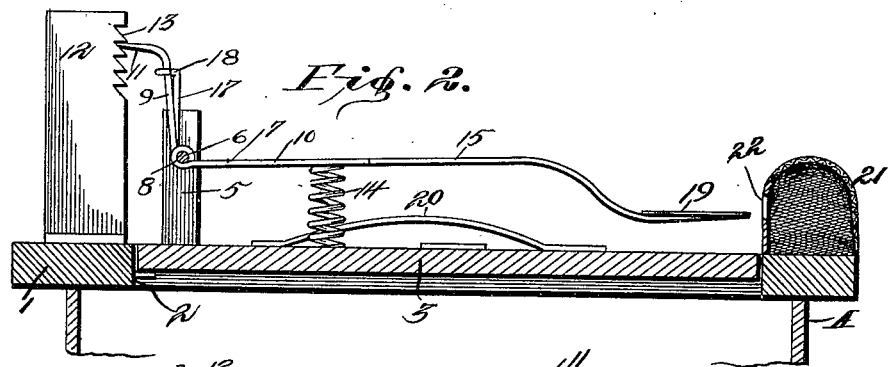
Figures 3, 4:
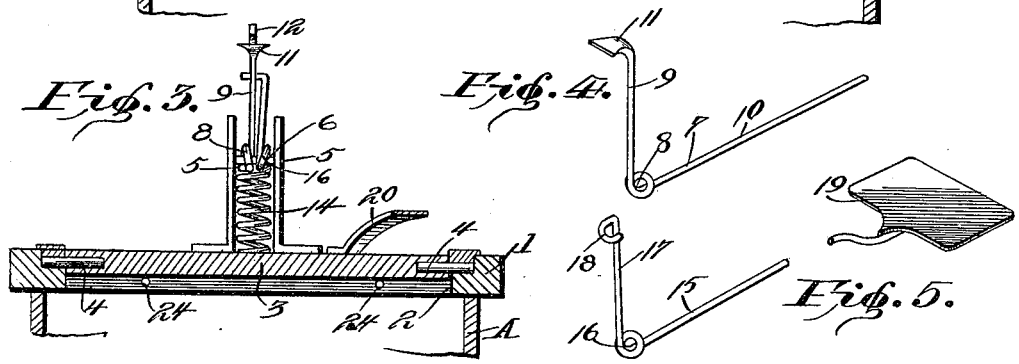
Figure 5:
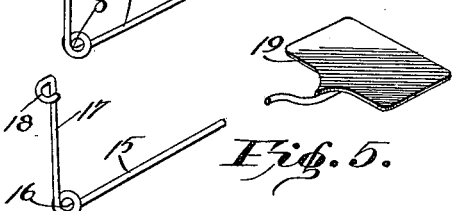

In the drawings, Figure 1 is a top plan view of the trap provided with the present improvements. Fig. 2 is a longitudinal sectional view thereof. Fig. 3 is a transverse sectional view taken on the line $x\,x$, Fig. 2. Fig. 4 is a detail perspective view of the catch-lever. Fig. 5 is a detail perspective view of the trip-lever.

Referring to the accompanying drawings, 1 designates a flat base or frame having an opening 2 provided therethrough and a platform 3 fitted in said opening flush with the upper face of the base or frame and mounted to tilt or swing upon opposite pivots 4, which are carried by opposite sides of the opening 2 and located intermediate of the ends of the platform. It will be understood that the base or platform 1 is adapted to be placed upon a box or inclosure A, so as to cover the open upper end thereof and into which the animal is adapted to be dropped by means of the tilting or swinging platform 3, as will be hereinafter more fully described.

Located at one end of the platform and to one side of the pivotal axis thereof is a post comprising opposite spaced members 5, which are connected by means of a transverse pin 6. Mounted upon this pin 6 between the opposite post members is a catch 7, preferably formed from a single length of wire twisted intermediate of its ends into a coil 8, which surrounds the pin 6, so as to pivotally mount the catch to the post. The portions of the wire at opposite sides of the coil 8 are bent into arms 9 and 10, respectively extending at substantially right angles to each other, and thereby form a bell-crank catch-lever. The upright arm 9 is provided with a suitable catch-head 11. Provided upon the top of the base in advance of the platform and in longitudinal alinement with the catch 7 is an upright standard 12, having a toothed edge or rack 13 adjacent to the catch-head 11, which is adapted to engage therewith and hold the platform in its normal position. Carried by the tilting platform is a spring 14, located in rear of the post 5 and bearing upwardly against the rear end of the horizontal arm 10 of the catch-lever, whereby the catch-head 11 is normally held in engagement with the notches of the rack 13, so as to lock the platform in its normal horizontal position. Suitable stop-pins 24 project inwardly from the front wall of the opening in the base or frame, and the forward end of the platform is adapted to rest thereon in the normal set position of the trap. These pins also prevent the platform from being thrown past the horizontal position thereof by the leaf-spring 23.

The bell-crank catch-lever is adapted to be disengaged from the rack 13 by means of a bell-crank trip-lever 15, which is formed from a single length of wire twisted intermediate of its ends into a coil or eye 16, embracing the pin 6 of the post 5, pivotally mounting the lever thereto and at one side of the catch-lever. It will be seen that this lever extends horizontally in opposite directions from the coil or eye 16, and the forward end thereof is bent into an upright arm 17, which is bent laterally at its upper end, so as to provide a transverse trip head or shoulder 18, engaging across the forward side of the upright arm 9 of the catch-lever. The portion of the trip-lever extending in rear of the post 5 is provided at its rear extremity with a comparatively broad and flat treadle 19, upon which the animal is adapted to step, and thereby disengage the catch-lever.

Fastened to the upper face of the base or frame 1 and in rear of the pivotal axis of the tilting platform is a bowed leaf-spring 20, having its free end engaging the upper face of the platform, at the opposite forward side of the pivotal axis thereof, whereby the platform is returned to its normal position after having its rear end tilted or swung downward by an animal.

Provided upon the upper face of the frame 1, adjacent to the rear end of the tilting platform 3 and in longitudinal alinement with the treadle 19, is a bait-holder 21, which is preferably formed of foraminous material, having its forward side, which is adjacent to the treadle, provided with a suitable opening 22, through which the bait may be introduced into the holder. It is preferable to have the front side of the holder rounded, as shown, and formed of tin or some suitable smooth metal, so that the animal may not obtain a foothold upon the holder when the platform is tilted, and thereby permit of the escape of the animal.

In the operation of the device, the tilting platform being locked in position by means of the catch-lever, as hereinbefore described, the animal in attempting to obtain the bait contained in the holder will approach the opening 22 and of necessity must step upon the treadle 19, whereby the weight of the animal will trip the catch-lever and the rear end of the platform will be tilted downward, thereby dropping the animal into the interior of the inclosure A.

It will be understood that the present invention is adapted for catching animals of different sizes, as the device may be used in connection with a box or barrel for catching mice and rats and may also be constructed larger and stronger and used in connection with a hole or pit provided in the ground for entrapping wild animals.

What I claim is—

1. In a trap of the class described, the combination with a base or frame having an opening provided therein, of a tilting platform mounted within said opening, a rack carried by the base or frame, a catch-lever mounted upon the tilting platform and adapted to engage the rack in the normal position of the platform, and a trip-lever mounted upon the platform and adapted to disengage the catch-lever from the rack, substantially as shown and described.

2. In a trap of the class described, the combination with a base or frame having an opening provided therethrough, of a tilting platform mounted in said opening, an upright rack carried by the base or frame and located near one end of the platform and at one side of the pivotal axis thereof, an upright post carried by the platform, a bell-crank catch-lever pivoted to the post and provided with a catch-head adapted to engage the rack, a spring interposed between one of the arms of the catch-lever and the platform, whereby the catch-head is normally held in engagement with the rack, and a bell-crank trip-lever pivoted to the post and provided with a trip-head adapted to engage the catch-lever and disengage the same from the rack, substantially as shown and described.

3. In a trap of the class described, the combination with a frame or base having an opening provided therethrough, of a tilting platform mounted in said opening, a rack carried by the frame or base at one side of the pivotal axis of the platform, an upright post having a transverse pivot-pin and carried by the platform, a bell-crank catch-lever formed from a single length of wire twisted intermediate of its ends around the transverse pivot-pin, whereby the lever is mounted upon the post, and a bell-crank lever formed from a single length of wire twisted about the transverse pivot-pin, whereby the lever is pivoted to the post at one side of the catch-lever, the free end of one of the arms of the trip-lever being bent or deflected transversely and adapted to engage one of the arms of the catch-lever, whereby the latter may be disengaged from the rack, substantially as shown and described.

4. In a trap of the class described, the combination with a base or frame having an opening provided therethrough, of a tilting platform mounted within said opening, a rack carried by the frame or base at one side of the pivotal axis of the platform, an upright post carried by the platform, a catch-lever mounted upon the post and adapted to engage the rack, a trip-lever mounted upon the post and adapted to engage the catch-lever, a treadle carried by the free end of the trip-lever, and a bait-holder carried by the base and located adjacent to the treadle, substantially as shown and described.

5. In a trap of the class described, the combination with a base or frame having an opening provided therethrough, of a tilting platform mounted within the opening, a rack carried by the base or frame and at one side of the pivotal axis of the platform, a catch-lever mounted upon the platform and adapted to normally engage the rack, a trip-lever mounted upon the platform and adapted to disengage the catch-lever, a treadle carried by one end of the trip-lever, a bait-holder carried by the base, located in rear of the tilting platform and in line with the treadle, and provided with an opening adjacent to said treadle, substantially as and for the purpose set forth.

6. In a trap of the class described, the combination with a base or frame having an opening provided therethrough, of a tilting frame mounted within the opening, a catch-lever adapted to lock the platform in its normal position, a trip-lever having a treadle, and a bait-holder formed of foraminous material and having a smooth rounded front side provided with an opening, said bait-holder being carried by the base or frame and having the opening in its smooth side located adjacent to the treadle, substantially as and for the purpose set forth.

In testimony that I claim the foregoing as my own I have hereto affixed my signature in the presence of two witnesses.

WILLIAM S. VANKIRK.

Witnesses:
SAML. B. GRAY,
H. B. CARTER.